(12) United States Patent
Wu et al.

(10) Patent No.: US 12,422,845 B2
(45) Date of Patent: Sep. 23, 2025

(54) VEHICLE CONTROL SYSTEM, HEAD-MOUNTED DISPLAY DEVICE, AND VEHICLE CONTROL METHOD

(71) Applicant: HTC Corporation, Taoyuan (TW)

(72) Inventors: Jun Rei Wu, Taoyuan (TW); Shi-Hao Dong, Taoyuan (TW); Jia-Yau Shiau, Taoyuan (TW)

(73) Assignee: HTC CORPORATION, Taoyuan (CN)

( * ) Notice: Subject to any disclaimer, the term of this patent is extended or adjusted under 35 U.S.C. 154(b) by 232 days.

(21) Appl. No.: 17/984,239

(22) Filed: Nov. 10, 2022

(65) Prior Publication Data
US 2024/0160204 A1 May 16, 2024

(51) Int. Cl.
G05D 1/00 (2024.01)
G02B 27/01 (2006.01)
G06F 3/01 (2006.01)
G06T 7/579 (2017.01)

(52) U.S. Cl.
CPC ......... G05D 1/0044 (2013.01); G02B 27/017 (2013.01); G05D 1/0016 (2013.01); G05D 1/0038 (2013.01); G06F 3/017 (2013.01); G06T 7/579 (2017.01)

(58) Field of Classification Search
CPC .. G05D 1/0044; G05D 1/0016; G05D 1/0038; G06T 7/579; G06F 3/017; G02B 27/017; G02B 27/0172; G02B 2027/0174; G02B 27/0176; G02B 2027/0178
See application file for complete search history.

(56) References Cited

U.S. PATENT DOCUMENTS 9,274,337 B2 * 3/2016 Meadows ............ G02B 27/017
9,459,692 B1 * 10/2016 Li ........................ G02B 27/017
10,354,404 B2 * 7/2019 Kuznetsov ................ B60R 1/31
(Continued)

FOREIGN PATENT DOCUMENTS

CN 109561282 A * 4/2019 ............. G05D 1/101
CN 118061924 A * 5/2024
(Continued)

OTHER PUBLICATIONS

CN-118061924-A machine translation (Year: 2024).*
(Continued)

*Primary Examiner* — Angelina M Shudy
(74) *Attorney, Agent, or Firm* — JCIPRNET (57) ABSTRACT

The disclosure provides a vehicle control system. The vehicle control system includes a vehicle and a head-mounted display device. The vehicle is used to provide first coordinate information. The head-mounted display device is used to provide and display second coordinate information. In response to the head-mounted display device receiving the first coordinate information, the head-mounted display device matches the first coordinate information with the second coordinate information to provide third coordinate information and display an augmented image based on the third coordinate information. In response to the head-mounted display device receiving a control instruction input by a user based on the augmented image, the head-mounted display device outputs a control command to the vehicle, so that the vehicle performs a control action.

20 Claims, 3 Drawing Sheets

100

(56) References Cited

U.S. PATENT DOCUMENTS

| | | | | |
|---|---|---|---|---|
| 10,365,481 | B2* | 7/2019 | Thomas | G02B 27/0093 |
| 10,503,245 | B2* | 12/2019 | Rothkopf | G02B 27/0179 |
| 10,885,819 | B1* | 1/2021 | Verbeke | G02B 27/0093 |
| 11,079,753 | B1* | 8/2021 | Roy | G05D 1/0038 |
| 11,463,614 | B2* | 10/2022 | Sung | H04N 23/62 |
| 11,504,609 | B2* | 11/2022 | Mikhailov | G06F 3/013 |
| 11,676,346 | B2* | 6/2023 | Chang | G06T 19/006 |
| | | | | 340/989 |
| 12,093,444 | B2* | 9/2024 | Dorn | B60K 35/22 |
| 12,174,394 | B2* | 12/2024 | Kim | G06F 1/1637 |
| 12,210,230 | B1* | 1/2025 | Lewis | G02B 27/0093 |
| 2008/0278821 | A1* | 11/2008 | Rieger | H04N 13/344 |
| | | | | 359/630 |
| 2012/0120070 | A1* | 5/2012 | Baillot | G08B 25/14 |
| | | | | 345/419 |
| 2012/0242694 | A1* | 9/2012 | Hotta | G02B 27/01 |
| | | | | 345/633 |
| 2014/0309806 | A1* | 10/2014 | Ricci | G06F 21/31 |
| | | | | 701/1 |
| 2015/0142213 | A1* | 5/2015 | Wang | G05D 1/0038 |
| | | | | 701/2 |
| 2015/0294505 | A1* | 10/2015 | Atsmon | G06F 3/04815 |
| | | | | 345/633 |
| 2016/0048249 | A1* | 2/2016 | Chen | G06F 3/011 |
| | | | | 701/2 |
| 2016/0349849 | A1* | 12/2016 | Kwon | G06F 3/017 |
| 2017/0090589 | A1* | 3/2017 | Sharma | G06Q 30/0641 |
| 2017/0115730 | A1* | 4/2017 | Knebel | G06F 3/012 |
| 2017/0186240 | A1* | 6/2017 | Alaniz | G06T 19/006 |
| 2017/0192497 | A1* | 7/2017 | Lian | G05D 1/0044 |
| 2017/0251179 | A1* | 8/2017 | Smolyanskiy | G05D 1/0094 |
| 2017/0277180 | A1* | 9/2017 | Baer | G05D 1/0038 |
| 2017/0278486 | A1* | 9/2017 | Ishikawa | G06T 11/60 |
| 2017/0322623 | A1* | 11/2017 | McKenzie | G06F 3/04886 |
| 2017/0344223 | A1* | 11/2017 | Holzer | G06V 20/20 |
| 2018/0035606 | A1* | 2/2018 | Burdoucci | A01D 34/008 |
| 2018/0040162 | A1* | 2/2018 | Donnelly | G02B 27/0093 |
| 2018/0066956 | A1* | 3/2018 | Kim | G01C 21/3682 |
| 2018/0081426 | A1* | 3/2018 | Rothkopf | G06F 3/012 |
| 2018/0164802 | A1* | 6/2018 | Lacaze | G06T 3/20 |
| 2018/0188723 | A1* | 7/2018 | Lee | G05D 1/0016 |
| 2018/0224932 | A1* | 8/2018 | Von Novak | G06Q 10/00 |
| 2018/0249086 | A1* | 8/2018 | Ozawa | G02B 27/0172 |
| 2019/0025815 | A1* | 1/2019 | Saadoun | G06F 3/0383 |
| 2019/0035044 | A1* | 1/2019 | Ferguson | G01C 21/3453 |
| 2019/0039606 | A1* | 2/2019 | Fujita | B60W 50/14 |
| 2019/0206258 | A1* | 7/2019 | Chang | G06T 19/006 |
| 2019/0371024 | A1* | 12/2019 | Wisely Babu | G06V 10/82 |
| 2019/0384414 | A1* | 12/2019 | Woo | G06V 40/174 |
| 2020/0017122 | A1* | 1/2020 | Chatten | B60K 35/81 |
| 2020/0019156 | A1* | 1/2020 | Drew | A47L 9/2826 |
| 2020/0019778 | A1* | 1/2020 | Frei | A01B 59/042 |
| 2020/0078948 | A1* | 3/2020 | Krause | G06F 3/0346 |
| 2020/0117201 | A1* | 4/2020 | Oetken | G05D 1/0231 |
| 2020/0192352 | A1* | 6/2020 | Rastoll | G06V 20/58 |
| 2020/0195839 | A1* | 6/2020 | Sung | H04N 23/635 |
| 2020/0202706 | A1* | 6/2020 | Chaves | G08G 1/166 |
| 2020/0204280 | A1* | 6/2020 | Thagadur Shivappa | G01S 19/48 |
| 2020/0258306 | A1* | 8/2020 | Forutanpour | H04W 4/40 |
| 2020/0279483 | A1* | 9/2020 | Eather | G06T 11/006 |
| 2020/0385025 | A1* | 12/2020 | Nishimura | B60W 60/0053 |
| 2021/0070307 | A1* | 3/2021 | Welch | B60W 60/00 |
| 2021/0090201 | A1* | 3/2021 | Gildert | G06F 3/011 |
| 2021/0097866 | A1* | 4/2021 | Leary | G08G 1/205 |
| 2021/0173614 | A1* | 6/2021 | Shin | G06V 20/40 |
| 2021/0192787 | A1* | 6/2021 | Jung | G06V 20/20 |
| 2021/0200393 | A1* | 7/2021 | Wohlstadter | G06F 3/04883 |
| 2021/0216822 | A1* | 7/2021 | Paik | G06F 3/167 |
| 2021/0276422 | A1* | 9/2021 | Masoero | B60K 35/81 |
| 2021/0311472 | A1* | 10/2021 | Kleen | G05D 1/223 |
| 2021/0318135 | A1* | 10/2021 | Chandupatla | B60K 35/22 |
| 2021/0325878 | A1* | 10/2021 | Schlacks, IV | G05D 1/2246 |
| 2021/0365038 | A1* | 11/2021 | Ma | G05D 1/0248 |
| 2021/0403018 | A1* | 12/2021 | Kim | B60W 60/0051 |
| 2021/0403051 | A1* | 12/2021 | Jaegal | B60W 60/0059 |
| 2022/0009524 | A1* | 1/2022 | Oba | B60W 60/0057 |
| 2022/0075370 | A1* | 3/2022 | Shapira | G05D 1/24 |
| 2022/0147203 | A1* | 5/2022 | Agarwal | G06T 11/00 |
| 2022/0161616 | A1* | 5/2022 | Golgiri | B62D 1/00 |
| 2022/0185306 | A1* | 6/2022 | Yeom | B60W 50/14 |
| 2022/0203996 | A1* | 6/2022 | Katz | B60W 50/14 |
| 2022/0208008 | A1* | 6/2022 | Matsuoka | B60W 50/14 |
| 2022/0212685 | A1* | 7/2022 | Oba | B60W 50/0098 |
| 2022/0244726 | A1* | 8/2022 | Shigeta | H04N 7/185 |
| 2022/0292971 | A1* | 9/2022 | Park | G06V 20/586 |
| 2022/0371503 | A1* | 11/2022 | Traub | G05D 1/0206 |
| 2023/0063386 | A1* | 3/2023 | Judi | G02B 27/0101 |
| 2023/0143034 | A1* | 5/2023 | Wu | G06T 3/20 |
| | | | | 345/423 |
| 2023/0176386 | A1* | 6/2023 | Kim | G06F 3/04815 |
| | | | | 345/8 |
| 2023/0258466 | A1* | 8/2023 | Lee | G01C 21/3476 |
| | | | | 701/426 |
| 2024/0019873 | A1* | 1/2024 | Li | G05D 1/0808 |
| 2024/0019875 | A1* | 1/2024 | Consiglieri Pedroso Mendes Dias | G08G 5/53 |
| 2024/0078763 | A1* | 3/2024 | Hedman | G06T 19/006 |
| 2024/0083442 | A1* | 3/2024 | Zhao | B60W 60/0051 |
| 2024/0087491 | A1* | 3/2024 | Jiang | B60K 35/81 |
| 2024/0134195 | A1* | 4/2024 | Lee | G02B 27/0172 |
| 2024/0144608 | A1* | 5/2024 | Panainte | G06F 3/011 |
| 2024/0177836 | A1* | 5/2024 | Paik | A61B 5/742 |
| 2024/0219902 | A1* | 7/2024 | Maniatopoulos | G05D 1/2246 |
| 2024/0253649 | A1* | 8/2024 | Bennett | B60W 60/0051 |
| 2024/0262192 | A1* | 8/2024 | Hamdan | B60K 35/22 |
| 2024/0302894 | A1* | 9/2024 | Bauernfeind | G06V 20/59 |
| 2024/0317304 | A1* | 9/2024 | Oba | B60W 50/0097 |
| 2024/0411306 | A1* | 12/2024 | Boesch | G05D 1/0038 |
| 2024/0416952 | A1* | 12/2024 | Maniatopoulos | G05D 1/0044 |
| 2025/0162609 | A1* | 5/2025 | Li | B60W 50/16 |

FOREIGN PATENT DOCUMENTS

| | | | | |
|---|---|---|---|---|
| DE | 102019201134 B4 | * | 7/2021 | G02B 27/017 |
| DE | 102021109083 A1 | * | 10/2022 | G06F 3/011 |
| KR | 20150034408 A | * | 4/2015 | G02B 27/017 |

OTHER PUBLICATIONS

CN-109561282-A machine translation (Year: 2019).*
KR-20150034408-A machine translation (Year: 2015).*
DE-102019201134-B4 machine translation (Year: 2019).*
DE-102021109083-A1 machine translation (Year: 2021).*

* cited by examiner

VEHICLE CONTROL SYSTEM, HEAD-MOUNTED DISPLAY DEVICE, AND VEHICLE CONTROL METHOD

TECHNICAL FIELD

The invention relates to a vehicle control system. In particular, the invention relates to a vehicle control system, a head-mounted display device, and a vehicle control method.

DESCRIPTION OF RELATED ART

In the field of vehicle driving assistance, to achieve the effect of enhancing convenience and safety, a vehicle may be equipped with a variety of assistance systems, for example, an adaptive cruise control (ACC) system, an anti-lock braking system (ABS), an autonomous emergency braking (AEB), an electronic stability program (ESP), a lane keeping assistance (LKA), an automatic parking system (APS), and so on. The above systems are typically integrated into an advanced driver assistance system (ADAS) for a user to operate.

However, information of the ADAS is typically presented to the user in a two-dimensional manner through a screen on the dashboard or a head-up display (HUD) on the windshield. Moreover, when performing an operation, the user also gives an instruction in a two-dimensional manner. Accordingly, the information presented by the ADAS is typically relatively complicated, and the user needs a certain amount of time for learning the operation.

SUMMARY

The invention provides a vehicle control system, a head-mounted display device, and a vehicle control method, presenting information of a vehicle to a user in an intuitive and convenient manner.

The vehicle control system of the invention includes: a vehicle used to provide first coordinate information; and a head-mounted display device used to provide and display second coordinate information. In response to the head-mounted display device receiving the first coordinate information, the head-mounted display device matches the first coordinate information with the second coordinate information to provide third coordinate information and display an augmented image based on the third coordinate information. In response to the head-mounted display device receiving a control instruction input by a user based on the augmented image, the head-mounted display device outputs a control command to the vehicle, so that the vehicle performs a control action.

The head-mounted display device of the invention includes: a device sensor used to sense device sensing information around a user; and a processor receiving first coordinate information from a vehicle and receiving the device sensing information to generate second coordinate information, where the processor matches the first coordinate information with the second coordinate information to provide third coordinate information and display an augmented image based on the third coordinate information, and in response to the head-mounted display device receiving a control instruction input by the user based on the augmented image, the head-mounted display device outputs a control command to the vehicle, so that the vehicle performs a control action.

The vehicle control method of the invention includes: receiving first coordinate information from a vehicle; receiving second coordinate information from a head-mounted display device; matching the first coordinate information with the second coordinate information to generate third coordinate information; displaying an augmented image based on the third coordinate information; receiving a control instruction input by a user based on the augmented image; and outputting a control command to the vehicle according to the control instruction, so that the vehicle performs a control action.

Based on the foregoing, the user may clearly understand the current driving state, and give an instruction in an intuitive and convenient manner.

To make the aforementioned features and advantages of the invention more comprehensible, embodiments accompanied with drawings are described in detail as follows.

DESCRIPTION OF THE EMBODIMENTS

To make the content of the invention more easily comprehensible, embodiments are provided below to serve as examples according to which the invention can be carried out reliably. In addition, wherever possible, elements/members/steps using the same reference numerals in the drawings and the embodiments denote the same or like parts.

Moreover, unless otherwise defined, all terms (including technical and scientific terms) used herein have the same meaning as commonly understood by one of ordinary skill in the related art. It will be further understood that, terms such as those defined in commonly used dictionaries should be interpreted as having meanings consistent with their meanings in the related art and the context of the invention, and will not be interpreted in idealized or overly formal meanings unless herein clearly defined so.

The invention can be understood by referring to the following detailed description accompanied with the drawings. It should be noted that, for the ease of understanding by readers and the clarity of the drawings, several drawings in the invention only illustrate part of an electronic device, and specific elements in the drawings are not drawn to the actual scale. Besides, the numbers and sizes of elements in the figures are only exemplary and are not intended to limit the scope of the invention.

It should be noted that technical features in several different embodiments provided below may be replaced, recombined, and mixed to achieve other embodiments without departing from the spirit of the invention. Moreover, in the description below and in the claims, terms such as "comprise" and "include" are open-ended terms, and should thus be interpreted as "comprise but not limited to . . . ".

In the field of vehicle driving assistance, a vehicle may be equipped with an ADAS to achieve the effect of enhancing convenience and safety. However, information of the ADAS is typically presented to the user in a two-dimensional manner through a screen on the dashboard or a HUD on the windshield. Moreover, when performing an operation, the user also gives an instruction in a two-dimensional manner.

Compared with the two-dimensional manner, information can be presented more clearly or operation can be more intuitive in a three-dimensional manner. The disclosure introduces the application of a head-mounted display device, so that the information of the ADAS can be presented in a three-dimensional manner, and the user may give an instruction in a three-dimensional manner. In this way, the convenience and safety of the user when driving the vehicle can be effectively improved.

Figure 1:
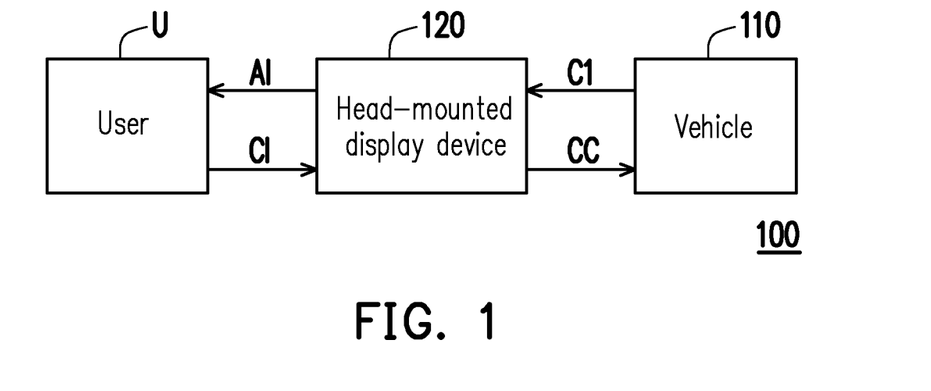
FIG. 1 is a schematic diagram of a vehicle control system according to an embodiment of the invention.

FIG. 1 is a schematic diagram of a vehicle control system according to an embodiment of the invention. With reference to FIG. 1, a vehicle control system 100 includes a vehicle 110 and a head-mounted display device 120. The vehicle 110 may be used to provide first coordinate information C1. The head-mounted display device 120 may be used to provide and display second coordinate information C2 (not shown in the figure). Moreover, in response to the head-mounted display device 120 receiving the first coordinate information C1, the head-mounted display device 120 matches the first coordinate information C1 with the second coordinate information C2 to provide third coordinate information C3 (not shown in the figure) and display an augmented image AI based on the third coordinate information C3. Furthermore, in response to the head-mounted display device 120 receiving a control instruction CI input by a user U based on the augmented image AI, the head-mounted display device 120 outputs a control command CC to the vehicle 110, so that the vehicle 110 performs a control action.

In an embodiment, the vehicle 110 may be, for example, a car, a truck, a bus, a train, a subway, a motorcycle, or the like, which is adapted to carry the user U, but the disclosure is not limited thereto. The vehicle 110 may include an ADAS to provide information about the vehicle 110 and the environment.

In an embodiment, the head-mounted display device 120 may be, for example, head-mounted display glasses or other wearable display devices adapted to be worn on the head of the user U, but the disclosure is not limited thereto. The head-mounted display device 120 may include one or more screen(s) to display various images to the user U.

In an embodiment, the first coordinate information C1 and the second coordinate information C2 are generated through simultaneous localization and mapping (SLAM) technology. In other words, the first coordinate information C1 and the second coordinate information C2 may be, for example, SLAM maps.

In an embodiment, the head-mounted display device 120 may match the SLAM maps respectively corresponding to the first coordinate information C1 and the second coordinate information C2 to provide the third coordinate information C3. For example, the environment where the vehicle 110 and the user U are located may include a plurality of objects, such as other vehicles, road signs, pedestrians, and buildings. In the first coordinate information C1, a specific object may be presented in the form of a first characteristic pattern. In the second coordinate information C2, the same specific object may be presented in the form of a second characteristic pattern. The head-mounted display device 120 may compare the first characteristic pattern with the second characteristic pattern to determine whether they are the same object.

In an embodiment, the vehicle 110 may be preset with specific characteristic patterns for the vehicle control system 100 to perform identification. For example, the specific characteristic patterns may include an Augmented reality University of Cordoba (ArUco) marker, a tracker, a reference object, other elements with similar functions, or a combination of these elements, which is not limited by the disclosure. The specific characteristic patterns may be provided to the vehicle 110 and the head-mounted display device 120 to respectively serve as the first characteristic pattern and the second characteristic pattern, accordingly achieving the function of correction. In this way, the vehicle control system 100 does not need to search for other objects for comparison, accordingly increasing the efficiency of comparing the first characteristic pattern with the second characteristic pattern.

In an embodiment, three-dimensional model information of the vehicle 110 may be stored in the head-mounted display device 120 in advance. Moreover, the head-mounted display device 120 may match the first coordinate information C1 with the second coordinate information C2 according to the three-dimensional model information of the vehicle 110. For example, the three-dimensional model information of the vehicle 110 may include information on the shapes and sizes of elements inside and outside the vehicle 110, but the disclosure is not limited thereto. That is to say, during comparison, the head-mounted display device 120 may prioritize comparing the characteristics possessed by the vehicle 110, accordingly increasing the efficiency of comparing the first characteristic pattern with the second characteristic pattern.

Next, when the head-mounted display device 120 determines that they are the same object (i.e., the first characteristic pattern and the second characteristic pattern match each other), the head-mounted display device 120 can obtain the matching relationship between the first coordinate information C1 and the second coordinate information C2. Next, the head-mounted display device 120 may project or superimpose the content in the second coordinate information C2 to the first coordinate information C1 according to the matching relationship to generate the third coordinate information C3. That is to say, in the third coordinate information C3, the coordinates of the first coordinate information C1 and the second coordinate information C2 are aligned to integrate the contents of the first coordinate information C1 and the second coordinate information C2. Then, the head-mounted display device 120 may generate and display the augmented image AI based on the third coordinate information C3. In other words, from viewing the augmented image AI, the user U may obtain the content of the first coordinate information C1 obtained by the vehicle 110.

Moreover, after viewing the augmented image AI, the user U may input the control instruction CI based on the augmented image AI. In an embodiment, the control instruction CI may be, for example, a gesture or a voice of the user U, but the invention is not limited thereto. After the head-mounted display device 120 detects and receives the control instruction CI, the head-mounted display device 120 may output the control command CC to the vehicle 110, so that the vehicle 110 performs a control action. In an embodiment, the control action of the vehicle 110 may be, for example, planning a drive route (e.g., heading to a specific destination, automatically following a car, and automatically parking) or setting a driving state (e.g., switching to automated driving or manual driving), but the disclosure is not limited thereto.

In an embodiment, when the user U views the augmented image AI and finds a destination that the user U intends to head to around the vehicle 110, the user U may give the control instruction CI in the form of a gesture or a voice. The head-mounted display device 120 may output the control command CC according to the control instruction CI, so that the vehicle 110 plans a drive route to the destination or automatically moves to the destination. For example, the destination may be a gate of a building, a parking space, or other scenes seen by the user U in the augmented image AI, but the disclosure is not limited thereto.

In an embodiment, when the user U views the augmented image AI and finds a target vehicle heading to the same route in front of the vehicle 110, the user U may give the control instruction CI in the form of a gesture or a voice. The head-mounted display device 120 may output the control command CC according to the control instruction CI, so that the vehicle 110 automatically follows the target vehicle. For example, the target vehicle may be a vehicle driving on the same expressway or a vehicle driven by a person known to the user U, but the disclosure is not limited thereto.

In an embodiment, when the user U views the augmented image AI and finds information that the user U intends to understand (e.g., a license plate of a vehicle in front or a road sign on the road) around the vehicle 110, the user U may give the control instruction CI in the form of a gesture or a voice. The head-mounted display device 120 may enlarge the information that the user U intends to understand in the augmented image AI according to the control instruction CI. Moreover, the head-mounted display device 120 may output the control command CC according to the control instruction CI to control the driving state of the vehicle 110 (e.g., switch to automated driving) under the condition of maintaining safety, which is convenient for the user U to have sufficient time to clearly see the information that the user U intends to understand.

In an embodiment, when the user U views the augmented image AI and finds relatively complicated road conditions or sudden appearance of something worth noting around the vehicle 110, the user U may give the control instruction CI in the form of a gesture or a voice. The head-mounted display device 120 may switch the vehicle 110 from automated driving to manual driving according to the control instruction CI, which is convenient for the user U to intervene in drive route planning.

As can be seen from the above, by integrating the relevant information of the vehicle 110 into the head-mounted display device 120, the user U may clearly understand the current driving state and give an instruction in an intuitive and convenient manner. In this way, the convenience and safety of the user U when driving the vehicle 110 can be effectively improved.

Figure 2:
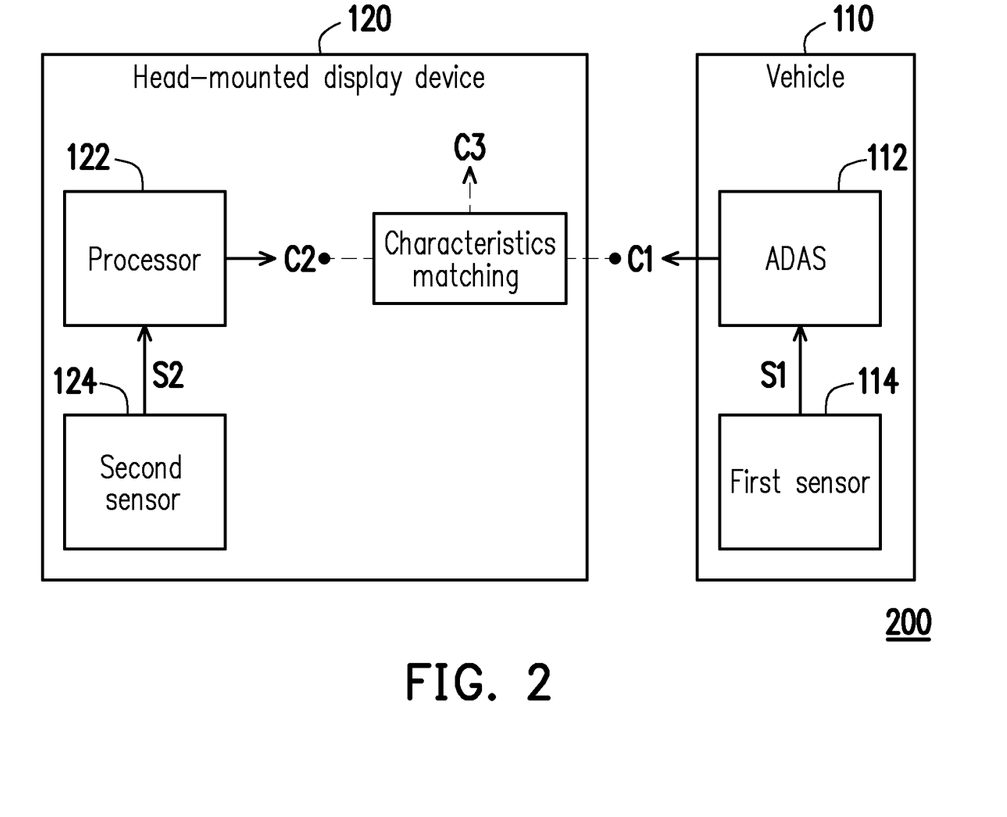
FIG. 2 is a schematic diagram of a vehicle control system according to an embodiment of the invention.

FIG. 2 is a schematic diagram of a vehicle control system according to an embodiment of the invention. With reference to FIG. 2, a vehicle control system 200 of FIG. 2 is an implementation of the vehicle control system 100 of FIG. 1, but the disclosure is not limited thereto. The vehicle control system 200 may include the vehicle 110 and the head-mounted display device 120. The vehicle 110 may include an ADAS 112 and a first sensor 114 (also referred to as a vehicle sensor). The head-mounted display device 120 may include a processor 122 and a second sensor 124 (also referred to as a device sensor).

In an embodiment, the first sensor 114 may be used to sense first sensing information S1 (also referred to as vehicle sensing information) around the vehicle 110, and provide the first sensing information S1 to the ADAS 112, so that the ADAS 112 generate the first coordinate information C1. The first sensor 114 may be, for example, an infrared sensor, an ultrasonic sensor, a radar, a lidar, a video camera, or other similar devices or a combination of these devices, which is not limited by the disclosure. The ADAS 112 may be, for example, a driving assistance system including at least one or more function(s) of an ACC system, an ABS, an AEB, an ESP, a LKA, an APS, and so on, but the disclosure is not limited thereto.

In an embodiment, the second sensor 124 may be used to sense second sensing information S2 (also referred to as device sensing information) around the user U, and provide the second sensing information S2 to the processor 122 of the head-mounted display device 120 to generate the second coordinate information C2. The second sensor 124 may be, for example, a video camera or other similar devices, which is not limited by the disclosure. The processor 122 is, for example, a microcontroller unit (MCU), a central processing unit (CPU), a microprocessor, a digital signal processor (DSP), a programmable controller, a programmable logic device (PLD), or other similar devices or a combination of these devices, which is not limited by the invention. Besides, in an embodiment, the functions of the processor 122 may be implemented as multiple programming codes. The programming codes are stored in a memory and executed by the processor 122. Alternatively, in an embodiment, the functions of the processor 122 may be implemented as one or more circuit(s). The invention does not limit the functions of the processor 122 to being implemented by software or hardware.

It should be noted that, in this embodiment, both the processor 122 and the second sensor 124 are disposed in the wearable display device 120, but the disclosure is not limited thereto. In another embodiment, one or both of the processor 122 and the second sensor 124 may be disposed outside the wearable display device 120, and transmit data to each other in a wired or wireless manner. That is to say, the disclosure does not limit the processor 122 or the second sensor 124 to being disposed inside or outside the wearable display device 120.

In an embodiment, through the SLAM technology, data detected by the first sensor 114 of the vehicle 110 and the second sensor 124 of the head-mounted display device 120 may be respectively provided to the ADAS 112 and the processor 122 to generate the first coordinate information C1 and the second coordinate information C2. At this time, since the first coordinate information C1 and the second coordinate information C2 are generated independently of each other, they may respectively have different reference coordinates. That is to say, the coordinate value of the same object in the first coordinate information C1 and the second coordinate information C2 may be offset. To correct the offset amount, the vehicle 110 provides the first coordinate information C1 to the head-mounted display device 120, and matches the first coordinate information C1 with the second coordinate information C2 through the head-mounted display device 120.

For example, the head-mounted display device 120 may search for the first characteristic pattern and the second characteristic pattern corresponding to the same object respectively in the first coordinate information C1 and the second coordinate information C2, and correct the offset amount by aligning the two characteristic patterns. As shown in FIG. 2, through "characteristics matching" between the first coordinate information C1 and the second coordinate information C2, the corrected third coordinate information C3 may be generated after that. It should be noted that, for ease of indication, "characteristics matching" in FIG. 2 is illustrated outside the processor 122, but "characteristics matching" may be performed by the processor 122 that provides the second coordinate information C2 or by other elements, which is not limited by the disclosure.

Moreover, the first sensor 114 may have more diversified data than the second sensor 124. In an embodiment, the first sensor 114 is a lidar, and the second sensor 124 is a camera, but the disclosure is not limited thereto. The first sensor 114 may not only provide the first coordinate information C1, but may also provide three-dimensional detection information. In an embodiment, the three-dimensional detection information may be, for example, point cloud map information, but the disclosure is not limited thereto. The vehicle 110 may provide the three-dimensional detection information of the first sensor 114 to the head-mounted display device 120, and the head-mounted display device 120 may merge the three-dimensional detection information into the third coordinate information C3. That is to say, the third coordinate information C3 may include the image information detected by the camera and also the point cloud map information detected by the lidar. In other words, compared with the original first coordinate information C1, the precision and accuracy of the third coordinate information C3 can be effectively improved.

Accordingly, the head-mounted display device 120 may obtain the detection value from the lidar of the vehicle 110 without a lidar, improving the degrees of fidelity and detail of the augmented image AI. In this case, the user U may clearly know the relevant information of the vehicle 110 through the augmented image AI provided by the head-mounted display device 120. Moreover, the user U may accurately give a precise control instruction CI through the augmented image AI provided by the head-mounted display device 120. In this way, the convenience and safety of the user U when driving the vehicle 110 can be effectively improved.

Figure 3:
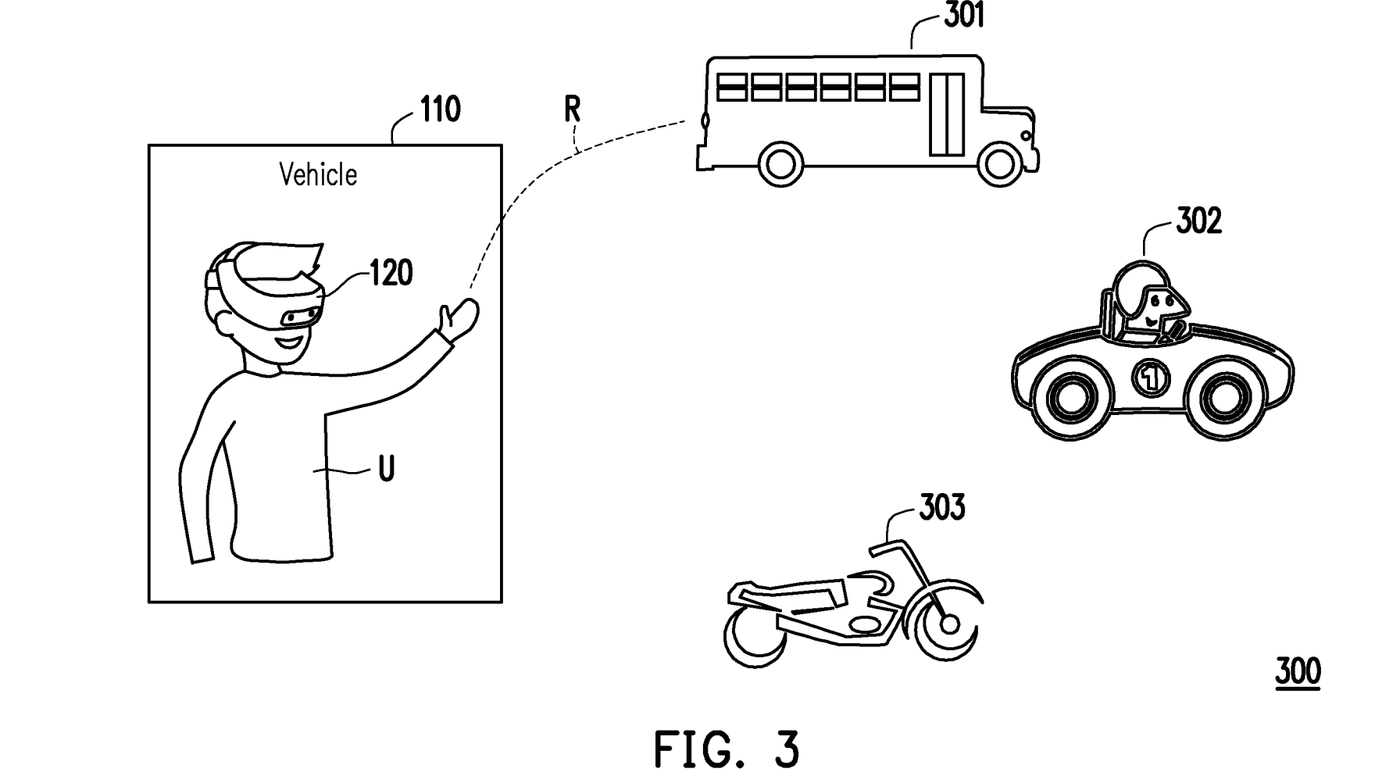
FIG. 3 is a schematic diagram of a use scenario according to an embodiment of the invention.

FIG. 3 is a schematic diagram of a use scenario according to an embodiment of the invention. With reference to FIG. 1 to FIG. 3, a use scenario 300 may include the vehicle 110, an object 301, an object 302, and an object 303. Moreover, the user U is located in the vehicle 110 and wears the head-mounted display device 120.

As shown in FIG. 3, the head-mounted display device 120 may detect an instruction direction of a gesture of the user U. In an embodiment, the head-mounted display device 120 may detect the gesture of the user U through the second sensor 124 that provides the second sensing information S2. In another embodiment, the head-mounted display device 120 may detect the gesture of the user U through other sensors different from the second sensor 124. Moreover, the instruction direction of the gesture of the user U may include, for example: the extension direction of the index finger of the user U or the axial direction of the center point of the wrist of the user U, but the disclosure is not limited thereto.

Then, the head-mounted display device 120 may display an instruction ray R in the augmented image AI according to the instruction direction of the user U. In an embodiment, the instruction ray R may be straight or curved, which is not limited by the disclosure. Besides, the head-mounted display device 120 may determine an instruction object in the augmented image AI according to the third coordinate information C3 and the instruction ray R. In an embodiment, the head-mounted display device 120 may determine that the instruction ray R extending from the user U hits a certain object around the vehicle 110 according to the third coordinate information C3, and determines this object to be the instruction object. For example, the instruction ray R of FIG. 3 hits the object 301, so the object 301 is determined to be the instruction object. Then, the head-mounted display device 120 may generate the control command CC according to the instruction object, and provide the control command CC to the vehicle 110 so that the vehicle 110 performs a control action.

In an embodiment, the control command CC may be, for example, setting a drive route based on the instruction object. For example, the instruction object is a vehicle in front of the vehicle 110, and the control command CC is setting a drive route of the vehicle 110 so that the vehicle 110 follows the vehicle in front. Alternatively, the instruction object is a parking space near the vehicle 110, and the control command CC is setting a drive route of the vehicle 110 to park the vehicle 110 at the parking space. Alternatively, the instruction object is a building near the vehicle 110, and the control command CC is setting a drive route of the vehicle 110 so that the vehicle 110 heads to the nearby building.

In an embodiment, the control command CC may be, for example, setting a driving state (automated driving/manual driving) of the vehicle 110 based on the instruction object. For example, the instruction object is a license plate of a vehicle in front of the vehicle 110, and the control command CC is setting a driving state of the vehicle 110 to switch the vehicle 110 from manual driving to automated driving, which is convenient for the user U to see the license plate of the vehicle in front.

It should be noted that the augmented image AI may further include two-dimensional map information generated based on the third coordinate information C3. That is to say, the user U may see two-dimensional map information of a selected area in the three-dimensional augmented image AI. In addition, the user U may sends the instruction ray R to the two-dimensional map information to select the instruction object.

It is worth mentioning that the head-mounted display device 120 may detect the augmented image AI at any time to determine whether any noteworthy situation (alert situation) appears. For example, the distance between the vehicle 110 and a surrounding object is less than the safety distance, a vehicle or a foreign object on the side is about to cut into the driving route of the vehicle 110, the road in front is abnormal, and so on. In response to determining an alert condition, the head-mounted display device 120 may display an alert message in the augmented image AI (e.g., in a visual manner of bounding boxes, masks, or the like or in other manners of alerting), so that the user U can understand the situation in real time to prevent dangers.

Figure 4:
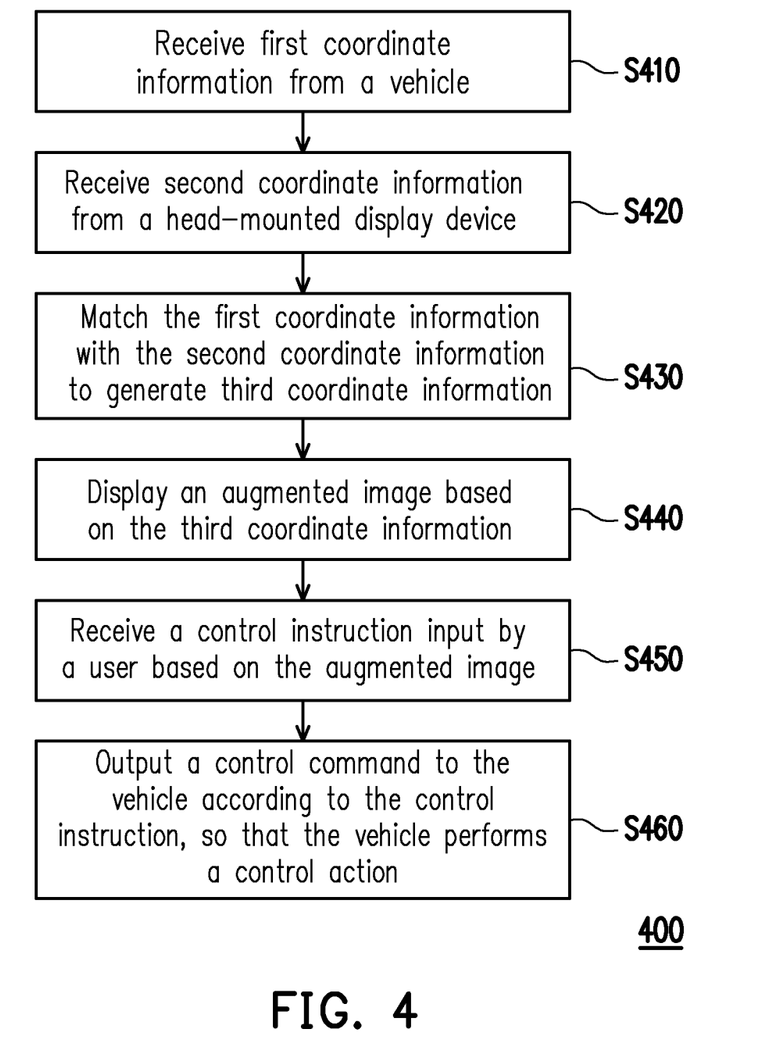
FIG. 4 is a flowchart of a vehicle control method according to an embodiment of the invention.

FIG. 4 is a flowchart of a vehicle control method according to an embodiment of the invention. With reference to FIG. 1 and FIG. 4, a vehicle control method 400 schematically represents operation process flows of the vehicle control system 100, but the disclosure is not limited thereto. In this embodiment, the vehicle control method 400 includes step S410 to step S460.

In step S410, the head-mounted display device 120 receives the first coordinate information C1 from the vehicle 110. In step S420, the head-mounted display device 120 receives the second coordinate information C2 generated by the head-mounted display device 120. In step S430, the head-mounted display device 120 matches the first coordinate information C1 with the second coordinate information C2 to generate the third coordinate information C3. In step S440, the head-mounted display device 120 displays the augmented image AI based on the third coordinate information C3. In step S450, the head-mounted display device 120 receives the control instruction CI input by the user U based on the augmented image AI. In step S460, the head-mounted display device 120 outputs the control command CC to the vehicle 110 according to the control instruction CI, so that the vehicle 110 performs a control action. For the relevant implementation details, reference may be made to the description of FIG. 1 to FIG. 3, which will not be repeated here.

In this way, the vehicle control method 400 may integrate the relevant information of the vehicle 110 into the head-mounted display device 120. Accordingly, the user U may clearly understand the current driving state and give an instruction in an intuitive and convenient manner. In this way, the convenience and safety of the user U when driving the vehicle 110 can be effectively improved.

In summary of the foregoing, in the vehicle control system, the head-mounted display device, and the vehicle control method of the invention, integration of the relevant information of the vehicle into the head-mounted display device is realized. Accordingly, the user may clearly know the relevant information of the vehicle through the augmented image provided by the head-mounted display device. Moreover, the user may accurately give a precise control instruction through the augmented image provided by the head-mounted display device. In this way, the convenience and safety of the user when driving the vehicle can be effectively improved.

Although the invention has been disclosed in the embodiments above, the embodiments are not intended to limit the invention. Anyone of ordinary skill in the related art may make some changes and modifications without departing from the spirit and scope of the invention. Accordingly, the protection scope of the invention should depend on those defined in the appended claims.

What is claimed is:

1. A vehicle control system comprising:
a vehicle, adapted to carry a user so that the user is located in the vehicle and configured to provide first coordinate information; and
a head-mounted display device, adapted to be worn on the user and comprising a device sensor and a processor, wherein the processor is configured to:
generate second coordinate information based on the device sensor,
in response to the processor receiving the first coordinate information, match the first coordinate information with the second coordinate information to provide third coordinate information and display an augmented image based on the third coordinate information;
detect a control instruction of a gesture of the user based on the augmented image, and output a control command to set a driving state of the vehicle, so that the vehicle is configured to perform a control action, wherein the driving state of the vehicle comprises switching from automated driving to manual driving or switching from manual driving to automated driving, and the control action comprises controlling the vehicle moving to a destination or controlling the vehicle following a target vehicle;
enlarge an instruction object in the augmented image based on the control command; and
in response to the instruction objection being enlarged, switch the driving state to automated driving.

2. The vehicle control system according to claim 1, wherein the first coordinate information and the second coordinate information are generated through simultaneous localization and mapping technology.

3. The vehicle control system according to claim 1, wherein the processor is configured to compare a first characteristic pattern of the first coordinate information with a second characteristic pattern of the second coordinate information to match the first coordinate information with the second coordinate information.

4. The vehicle control system according to claim 1, wherein the vehicle comprises:
an advanced driver assistance system; and
a first sensor,
wherein the first sensor is configured to sense first sensing information around the vehicle and provide the first sensing information to the advanced driver assistance system, so that the advanced driver assistance system generates the first coordinate information.

5. The vehicle control system according to claim 1, wherein
the device sensor is configured to sense second sensing information around the user, and
the processor is configured to generate the second coordinate information according to the second sensing information.

6. The vehicle control system according to claim 1, wherein the vehicle further provides three-dimensional detection information to the processor, and
the processor is configured to merge the three-dimensional detection information into the third coordinate information.

7. The vehicle control system according to claim 1, wherein the processor is further configured to:
detect an instruction direction of the gesture of the user;
display an instruction ray in the augmented image according to the instruction direction;
determine the instruction object in the augmented image according to the third coordinate information and the instruction ray; and
generate the control command according to the instruction object.

8. The vehicle control system according to claim 7, wherein the control command comprises setting a drive route based on the instruction object.

9. The vehicle control system according to claim 7, wherein the control command comprises setting the driving state of the vehicle based on the instruction object.

10. The vehicle control system according to claim 1, wherein the processor is further configured to match the first coordinate information with the second coordinate information according to three-dimensional model information of the vehicle.

11. A head-mounted display device, adapted to be worn on the user and comprising:
a device sensor, configured to sense device sensing information around a user; and
a processor, configured to:
receive first coordinate information from a vehicle and receive the device sensing information to generate second coordinate information, wherein the vehicle is adapted to carry the user so that the user is located in the vehicle,
match the first coordinate information with the second coordinate information to provide third coordinate information and display an augmented image based on the third coordinate information; and
detect a control instruction a gesture of the user based on the augmented image, and output a control command to set a driving state of the vehicle, so that the vehicle is configured to performs a control action, wherein the driving state of the vehicle comprises switching from automated driving to manual driving or switching from manual driving to automated driving, and the control action comprises controlling the vehicle moving to a destination or controlling the vehicle following a target vehicle;

enlarge an instruction object in the augmented image based on the control command; and in response to the instruction objection being enlarged, switch the driving state to automated driving.

12. The head-mounted display device according to claim 11, wherein the first coordinate information and the second coordinate information are generated through simultaneous localization and mapping technology.

13. The head-mounted display device according to claim 11, wherein the processor is configured to compare a first characteristic pattern of the first coordinate information with a second characteristic pattern of the second coordinate information to match the first coordinate information with the second coordinate information.

14. The head-mounted display device according to claim 11, wherein the processor is further configured to receive three-dimensional detection information from the vehicle, and merge the three-dimensional detection information into the third coordinate information.

15. The head-mounted display device according to claim 11, wherein the processor is further configured to:

detect an instruction direction of the gesture of the user;

display an instruction ray in the augmented image according to the instruction direction;

determine the instruction object in the augmented image according to the third coordinate information and the instruction ray; and generate the control command according to the instruction object.

16. The head-mounted display device according to claim 15, wherein the control command comprises a drive route based on the instruction object.

17. The head-mounted display device according to claim 15, wherein the control command comprises setting the driving state of the vehicle based on the instruction object.

18. The head-mounted display device according to claim 11, wherein the processor is further configured to match the first coordinate information with the second coordinate information according to three-dimensional model information of the vehicle.

19. A vehicle control method comprising:

receiving first coordinate information from a vehicle, wherein the vehicle is adapted to carry a user so that the user is located in the vehicle;

generating second coordinate information by a head-mounted display device, wherein the head-mounted display device is adapted to be worn on the user;

matching the first coordinate information with the second coordinate information to generate third coordinate information;

displaying an augmented image based on the third coordinate information;

detecting a control instruction a gesture of the user based on the augmented image;

outputting a control command to set a driving state of the vehicle according to the control instruction, so that the vehicle performs a control action, wherein the driving state of the vehicle comprises switching from automated driving to manual driving or switching from manual driving to automated driving, and the control action comprises controlling the vehicle moving to a destination or controlling the vehicle following a target vehicle;

enlarging an instruction object in the augmented image based on the control command; and in response to the instruction objection being enlarged, switching the driving state to automated driving.

20. The vehicle control method according to claim 19, further comprising:

receiving three-dimensional detection information from the vehicle; and merging the three-dimensional detection information into the third coordinate information.

* * * * *